United States Patent [19]

Frey

[11] 4,329,914
[45] May 18, 1982

[54] CYLINDER-PISTON COMBINATION PARTICULARLY FOR HIGH-PRESSURE APPLICATION

[75] Inventor: Bernhard Frey, Schaffhausen, Switzerland

[73] Assignee: Jydrpwatt Systems Limited, London, England

[21] Appl. No.: 127,590

[22] Filed: Mar. 6, 1980

Related U.S. Application Data

[63] Continuation of Ser. No. 860,183, Dec. 13, 1977, abandoned, which is a continuation of Ser. No. 639,700, Dec. 11, 1975, abandoned.

[30] Foreign Application Priority Data

Dec. 17, 1974 [CH] Switzerland ................. 16800/74
Nov. 27, 1975 [CH] Switzerland ................. 15354/75

[51] Int. Cl.$^3$ ............................................. F01B 19/04
[52] U.S. Cl. ................................. 92/105; 92/86.5; 92/153
[58] Field of Search ............... 92/83, 86.5, 105, 153, 92/156, 48

[56] References Cited

U.S. PATENT DOCUMENTS

| | | | |
|---|---|---|---|
| 2,027,979 | 1/1936 | Hopkins | 92/153 |
| 2,076,732 | 4/1937 | Kuehne | 92/48 |
| 2,191,861 | 2/1940 | Rymal | 92/153 |
| 2,197,012 | 4/1940 | Sauzedde . | |
| 2,342,906 | 2/1944 | Smith | 92/83 |
| 3,212,447 | 10/1965 | Browne | 92/48 |
| 3,902,404 | 9/1975 | Breit | 92/153 |

FOREIGN PATENT DOCUMENTS

1170451 3/1957 France ................................ 92/90

*Primary Examiner*—Abraham Hershkovitz
*Attorney, Agent, or Firm*—Werner W. Kleeman

[57] ABSTRACT

A deformable sealing member, particularly a sealing tube, which is at least partially elastic is secured at two distant locations to two working members, e.g. to a piston part and a cylinder part respectively to form a leakproof working chamber for pressurizing therein a working fluid or for transferring the power of a pressurized working fluid introduced in the working chamber to said working members, the apparatus thus being able to operate as a pump or motor respectively. The sealing member is supported against the working pressure in said chamber by a support surface, and between said sealing member and said support surface there being a low-friction component which is constituted by a solid material, e.g. a sliding layer, secured to the sealing member or to the support surface, or by a fluid lubricant introduced in a flow passage formed between the sealing member and the support surface, in the latter case there being a continuous or intermittent stream of lubricant through this lubricant flow passage at least during high-pressure strokes of the working chamber to a low-pressure side. The pressure in the lubricant flow passage is balanced against the pressure of the working fluid by throttle means formed by the gap between the deformed sealing member, when under pressure of the working fluid, and the support surface and automatically adjusted or regulated by the lubricant volume or pressure in said passage on one side and by the working pressure in said chamber on the other side so that substantial pressure balance between both surfaces of the sealing member wall will arise supporting the sealing member with distance from the support surface, i.e. substantially without friction and wear, and without excessive deformation. If solid low friction layers or surfaces are used, then "Teflon" or similar materials may be disposed on the sealing member and/or the support surface.

17 Claims, 13 Drawing Figures

CYLINDER-PISTON COMBINATION PARTICULARLY FOR HIGH-PRESSURE APPLICATION

CROSS-REFERENCE TO RELATED APPLICATIONS

This application is a continuation application of my U.S. application Ser. No. 860,183, filed Dec. 13, 1977, now abandoned, which in turn is a continuation application of my U.S. application Ser. No. 639,700, filed Dec. 11, 1975, the last-mentioned application having since become abandoned.

Further reference is made to Swiss patent application No. 3262/79 in the name of Hydrowatt Systems Ltd., London, filed Apr. 6, 1979, concerning the introduction of lubricant in low-pressure strokes.

BACKGROUND OF THE INVENTION

The present invention relates to a piston and cylinder combination and more particularly to a piston-cylinder structural arrangement for high-pressure, hydraulic pumps or motors, including motor devices for control positioning of heavy loads, remote control positioning, remote control locating, servo positioning, and the like. Combination of dual piston-cylinder arrangements can provide push-pull or double-acting effects.

Specifically, the present invention is directed to the structural arrangement which provides for tight closure of the fluid, preferably hydraulic fluid within a working chamber, e.g. a cylindrica chamber of variable volume as defined by the position of a piston as one working member being disposed in a cylinder as the other working member. Such closure is effected by means of a deformable sealing member, preferably a flexible elastic sealing tube, preferably made of an elastomer which is attached at two locations having distance from each other, e.g. with its respective ends, to the working members, e.g. piston and cylinder, respectively to form a leakproof, sealed, tight connection for the closure of working fluid which may be under very high pressure, for example in the order of 100 at gauge.

Piston-cylinder arrangements for high pressure application provided with leakproof seals are difficult to use in continuous high-power applications in which high operating frequencies, high operating speeds and high pressure arise. The low mechanical strength of the sealing tubes has heretofore inhibited such applications because, to provide a leakproof, tight seal, the sealing tube must be secured to the working members which move relatively to each other so that the sealing member must undergo frequently repeated deformations under heavy forces pressing a surface of the member against a support surface in relation to which the member is partially moved. Therefore, high frictional forces arise which can be reduced only by special arrangements. Heat due to friction as well as the frictional force itself cause rapid deterioration of the elastic portions of the seal, typically of elastomer material. Moreover the sealing member generally has hereto been locally clamped and has been terminated by an abrupt transition on the respective support element, that is, the piston or the cylinder disposed at the end of the tube under consideration. These terminations resulted in high-stress gradients in radial direction at localized points or zones of the sealing tube. These high stresses greatly reduced the durability of the sealing tubes.

SUMMARY OF THE INVENTION

It is an object of the present invention to provide a piston-cylinder combination forming an apparatus which is so constructed that it permits high power or force transfer by means of fluid media with high efficiency and at high speed in continuous operation, without losing its leakproof seal of the fluid working medium.

Briefly a deformable sealing member, e.g. an elastically deformable tube is provided which is slidable with respect to one working member. The sealing member preferably a sealing tube, is supported on a support surface through a solid or fluid low-friction component. The support surface typically is secured to or formed by the one of the working members in relation to which the sealing member is disposed in sliding connection.

The solid low-friction component may include a solid sliding coating or layer cover on the support surface for the sealing tube. The solid low-friction component may also be disposed on the sealing tube and then is extendible or stretchable and bonded or secured or is part of the surface thereof. The low-friction component may also be a fluid lubricant introduced between the sealing member or sealing tube and the support surface so that the lubricant under the action of the working pressure applied to the wall of the sealing member by the medium in the working chamber flows through and out of the gap between the support surface and the surface of the sealing member facing this support surface (in the following text shortly named the "facing surface" of the sealing member) to a low-pressure side. Thereby the support surface is provided with a fluid flow bearing which acts like a hydrostatic bearing. The lubricant flow is conducted through a throttle means or choke to the low-pressure side. The choke preferably is formed by a gap between the sealing tube and the support surface. The choke maintains the pressure balance between the lubricant and the working medium before the lubricant can be relieved of pressure and escape, preferably for recycling and re-use. The choke or throttle means may be formed by a portion of the sealing member, the surface of which is so constructed that in unloaded or unstressed condition it has some radial distance from the support surface; upon loading, a choke-type gap of reduced width compared with said distance in the unloaded or unstressed condition is formed, the size of which depends on the pressure of the working medium as well as the pressure of the lubricant or the lubricant volume present in the gap between the sealing member and the support surface so that the width of the gap will be self-adjusting in the sense of an automatic regulation or control of the lubricant pressure in the gap between the sealing member and the support surface so as to substantially balance the working medium pressure. The lubricant may be branched off from the working pressure fluid if this fluid is a liquid with lubricating properties. The deformable sealing member, preferably a tube-like element made of elastic material like a suitable elastomer, may be secured to the one of the working members which moves relatively to the support surface, in the region of a specifically shaped transition zone the wall-thickness of which varies in the direction from the working chamber to the low-pressure side in such a manner that the pressure exerted by the sealing member on the support surface via the low-friction component decreases in the said direction. Further, the sealing member has preferably a wall-thickness which decreases over at least part of the length of said transition zone in the said direction from the working chamber to the low-pressure side, which kind of shape has proven to most conveniently establish said decreasing support pressure and leads to reduced stress concentrations in the transition zone. Thus the decreasing wall-thickness in the transition zone preferably in combination with a portion of enlarged wall-thickness at the end of the transition zone located near the working chamber, i.e. of enlarged wall-thickness when compared with the one in the region of the sealing member extending over the working chamber has proven to be the "best mode of operation".

The transition zone is preferably formed of a plurality of partial elements, particularly at least two parts which are constructed of materials of different stiffness or resistance to deformation. This is a further measure which can be taken in order to establish a convenient pressure profile in the transition zone. The partial elements in the transition zone can be arranged in various ways; it is preferred, however, that at least one of the elements of lower stiffness than another, or others, forms at least a portion of the surface of the transition zone. The transition zone is usually loaded by the working medium at working fluid pressure and thus forms the throttle means explained above in the case of a lubricant fluid flow between the sealing member and the support surface being the low-friction component. A deformation in the transition zone results in a width of the throttle gap which depends on the pressure of the working medium and the pressure of the lubricant or the volume present in the gap of lubricant flow passage between the sealing member and the support surface in the region of the transition zone, this deformation establishing the self-adjustment or automatic regulation of the throttle means in the sense of maintaining the balance between the working and lubricant pressure. The deformation depending, in general, on the particular shape and stiffness of the different elements as well as on the shape of the junction surfaces between the various elements.

For reliable transfer of the stress under operating conditions between the sealing member and the adjacent working member it is preferable to establish a chemically or physically bonded junction between the transition zone and the working member as well as between the separate partial elements of the transition zone.

In a preferred form, the lubricant for supporting the sealing member is introduced in said gap or passage with a volume flow rate which is independent of the lubricant pressure in said gap or passage. This tends to secure the sealing member against damage by excessive deformation in case of said self-adjustment or regulation failing to operate as well as when introducing the lubricant in a low-pressure interval of the operating cycle.

On the other hand it is in many cases preferable to limit the intervals of introducing the lubricant in the gap or passage partially or completely to low-pressure strokes in the course of the operating cycles in case such low-pressure strokes occur in the prevailing mode of operation. This mode of lubricant introduction makes it possible to use low injection pressures which allows for comparatively simple and inexpensive lubricant injection pumping devices.

As a matter of course, in such a low-pressure interval enough lubricant has to be introduced in the gap or passage so as to establish sufficient reserve for maintaining lubricant flow through the passage and the throttle means to the low-pressure side necessary for the pressure balance on both sides of the sealing member wall. Suitable non-return valving means in the lubricant feed line has to be installed in order to maintain the pressure in the lubricant flow passage during the following high-pressure stroke.

The invention will be described in a way of example with reference to the accompanying drawings, wherein.

DETAILED DESCRIPTION OF THE PREFERRED EMBODIMENTS

The cylinder-piston combination (see FIG. 1) has a cylinder element 1, of approximately square or rectangular outer cross section (see FIG. 2) with a bore 2. The cylinder is closed off at one end by a cylinder end cover 3 secured thereto, for example by means of bolts (not shown), and forms a working chamber. The junction surface between the cylinder body 1 itself and the cover 3 is sealed by an O-ring 5 located in a groove 4 of the cylinder 1. A piston 6, which is essentially cylindrical or slightly conical and which forms the other working member, is located in bore 2 and guided therein by means of a piston rod 7. The piston rod 7 is slidable in a sleeve 8 which, in turn, is secured to a holder or clamp 9. The holder 9 extends through a bore 10 formed in the cover 3 of the cylinder and is secured therein by means of a nut 11. The holder 9 is formed with a longitudinal duct 12, extending lengthwise thereof, terminating in mouths or openings 13 at the inside and in a pipe coupling at the outside. The pressure working medium which may, for example, be a pressurized gas, hydraulic fluid or the like, is introduced or removed from the interior of the cylinder through the duct 12 and the openings 13 thereof. The holder 9 is formed with a thickened region 14 in the vicinity of the mouths 13.

Figures 1, 2, 3, 4, 5:
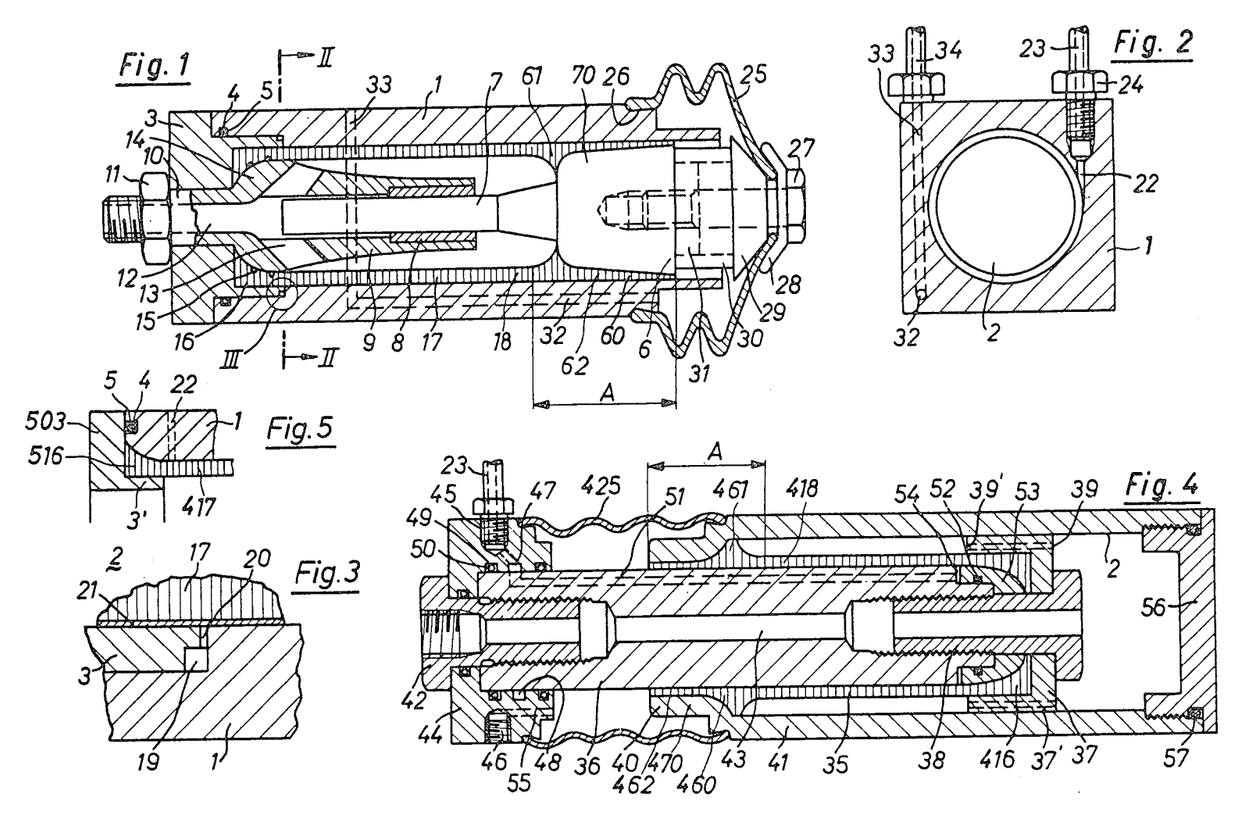
FIG. 1 is a longitudinal sectional view of a piston-cylinder apparatus in which a resilient sealing tube is loaded internally by the working fluid.
FIG. 2 is a transverse section along line II—II, with the interior elements of the arrangements omitted.
FIG. 3 is an enlarged fragmentary view of the region circled in FIG. 1 and identified at III.
FIG. 4 is a longitudinal sectional schematic view of a piston-cylinder arrangement in which the working pressure fluid is applied to the outside of the sealing tube.
FIG. 5 is a fragmentary cross-sectional area of one form of the sealing tube at the fixed non-movable end thereof.

The thickened region 14 has ridges thereon. The thickened region 14 is used to clamp the fixed end 16 of an elastic sealing tube 17 between the inner wall of the bore 2 of the cylinder and the outer surface of the holder 9. The tube 17 is clamped tightly between thickened region 14 and the inner wall of bore 2 to form in its interior a leakproof working chamber. The other end 18 of tube 17 is connected through a transition zone A to the piston 6. The tube 17 within the transition zone A is formed of two partial elements 60, 70, secured together at junction surface 62. The partial elements 60, 70 have different stiffness; the partial element 60 may be made of the same material as the sealing tube 17 and has a lower stiffness than the partial element 70 which merges into the piston 6 and may form a peripheral region thereof.

Operation: when pressure fluid is admitted through connection 11 and duct 12, the piston 6 will be forced to the right (FIG. 1) and tube 17 will elongate, and hence deform. The partial element 70 has a greater stiffness than partial element 60. The attachment at the junction surface may be by means of a physical adhesive or chemical bonding. At the side of the working chamber a thickened region 61 is provided in the transition zone A to influence the deformation of this zone and, further, to increase the junction surface 62.

The outside of the sealing tube 17 has a layer forming a durable sliding or low-friction surface 21 applied thereto. Surface 21, which may be in form of a thin layer, is securely adhered to the tube 17. It is important that the surfaces between the tube 17 and the inner wall of the cylinder 1 be of low friction; thus, the sliding surface may also be applied to the interior wall of the cylinder 1, and, if desired, sliding low-friction surface layers can be applied to both the tube 17 and the inner wall of the bore 2 of the cylinder 1. The outer dimension of tube 17 at zone A is such that a slight gap permitting radial play will be left between it and the wall of cylinder 1.

A ring groove 19 is located at the transition or junction between the cylinder 1 and the cover 3 (FIG. 3). The groove 19 is connected by means of a passage 20 with the bore 2 of the cylinder. The groove 19 communicates with a duct 22 (FIG. 2) formed in the wall of the cylinder 1. Duct 22 is in communication with a connecting line 23 which is connected to the cylinder 1 by means of a pipe thread coupling. A stream of pressurized lubricant is applied through duct 23, preferably independent of the working fluid pressure. The lubricant passes through the groove 19 into the gap or passage 20 between the outside of the sealing tube 17 and the inside wall of the bore 2 of the cylinder, which wall forms a support surface for the tube. It will spread at the outer circumference of the sealing tube 17 and can escape from between tube and support surface at the piston end of the cylinder-piston combination. The axial and particularly the radial deformation of the wall of the tube 17 in the transition zone A depends on the pressure of the working fluid and on the pressure of the lubricant stream or the lubricant volume in the gap or lubricant flow passage between the tube and the support surface within the transition zone and upstream thereof. The radial deformation of the tube wall, by which the "facing surface" of the tube gets closer to the support surface, typically increases under the combined action of the pressure in the lubricant flow passage and the drop thereof near the low-pressure side as well as of the working fluid pressure from the upstream end of the transition zone in the lubricant flow direction to a maximum and then decreases over the remaining length of the transition zone to the location of escape of the lubricant at the low-pressure side. Therefore, at the location of the said maximum radial deformation, i.e. of the minimum distance between the "facing surface" and the support surface, the gap or lubricant flow passage has its minimum width. Due to this deformation effect, in this region a self-adjusting or automatically regulated throttle acting as a hydraulic choke with respect to the lubricant at the outside of tube 17 is formed, which throttle or choke will achieve a pressure balance with the pressure of the working fluid or medium within tube 17, and active on piston 6. As far as the sealing tube 17 is concerned, therefore, the forces acting thereon will be in balance without physical contact, friction and wear between the tube and the support surface. Thus the sealing tube, the inside of which is loaded by the pressure of the working fluid, is supported at its outer circumference or "facing surface" by a thin flowing film of lubricant in pressure-balance with the pressure of the working fluid. Thus, the sealing tube is supported by the inner wall of the bore 2 of the cylinder without, however, touching the wall of the cylinder, so that the tube can slide freely with respect thereto. Tube 17 is supported thus by a hydrostatic-like bearing. The resulting friction is extremely low.

The lubricant which escapes at the piston-end of the combination is collected and re-cycled. A collecting bellows 25 is located at the piston-end of the cylinder 1. Bellows 25 is secured in the groove 26 and may be held at the outside by a clamp ring, if needed. The bellows is not stressed by fluid pressures and thus no specially devised or constructed holding arrangement is needed. The bellows 25 is centrally secured to piston 6 by means of a bolt 27 and clamped between a cover 28 and an internal shield 29. Shield 29 itself is held by a sleeve 30 supported on a shoulder 31 formed in the piston 6.

The lubricant collected within the bellows 25 is removed by means of ducts 32, 33 (FIG. 2) formed in the cylinder 1 and connected to a removal line 34. The ducts 32, 33 can be arranged in any suitable configuration and it is only necessary to so locate them that lubricant can be removed from the bellows 25. They may, for example, be secured in fluid-tight connection through a small opening formed in the bellows 25 itself and, since the fluid therefrom will not be under pressure, can be removed by a flexible, for example, plastic, tubing.

FIG. 4 illustrates an arrangement in which the sealing tube 35 is loaded by pressure fluid at the outside thereof. The sealing tube 35 is engaged by a smooth piston 36, the end of which is rounded. The end portion 416 of the sealing tube 35 is clamped by means of a clamp element 37 which is secured to piston 36 by bolt 38. The cylindrical portion 37' of the clamp 37 is extended to form a piston guide portion for the piston 36. The clamp element 37 is formed with through-bores 39 which conduct the working pressure fluid to the outside of the sealing tube 35. The other end 418 of the sealing tube 35 merges into the transition zone A which, similar to the arrangement of FIG. 1, includes the partial elements 460, 470, secured together at their junction surface 462. In the description that follows, similar parts have been given similar reference numerals, incremented by hundred numeral corresponding to the respective drawing. The transition zone A facing the sealing tube is formed with a thickened portion 461 which, however, in contrast to the zone 61 of FIG. 1, is located at the outside of sealing tube 35. The partial element 470 is, actually, a portion of the end 40 of the cylinder itself to which the tube 35 is engaged at the junction surface 462. In this embodiment as well, the thickness of the partial element 460 decreases towards the outside within the transition zone A so that, as in the embodiment of FIG. 1, the localized stiffness and form stability of the transition zone increase looked at from the side of the working pressure fluid.

A bore 43 in piston 36 provides working pressure fluid which can be applied to the piston by a suitable connection screwed into the coupling bore of a coupling bolt 42. Bolt 42 also secures the holding end 44 to the piston 36. The holding end 44 has threaded bores 45, 46 for connection of pressurized lubricant supply and a bore 47 with a ring groove 49 sealed by means of O-rings 50 located in grooves 48. A longitudinal bore 51 communicates with groove 48 and conducts lubricant to the end 416 of tube 35. A small ring groove or gap 54 is formed between the head portion 53 and the piston 36 itself, sealed by an O-ring 52. The ring groove is similar to ring groove 19 (FIG. 3) to permit escape of the lubricant between the piston 36 and the sealing tube 35 and allow spreading of the lubricant and escape at the left end beyond portion 418 of the tube 35 from between tube 35 and piston 36. The region beneath the tube 35 and, in transition zone A, forms a hydraulic choke of variable cross section controlled by the relative pressure of the working fluid and the lubricant. A sealing bellows 425 is provided to collect lubricant leaking from and escaping from beneath the left end of tube 35 for removal through duct 55.

The bolt 38 has a bore extending therethrough to permit working fluid to enter the cylinder chamber and to cause relative movement between the piston and the cylinder. The working pressure fluid is applied to the outside of the sealing tube 35 through the bores 39. The clamping bolt 38 holds the clamp element 37 which, in turn, is secured to the end 416 of the sealing tube 35 and further holds the head portion 53 to the piston 36 itself. The cylinder chamber is closed off by an outer cover 56 sealed by an O-ring 57. Lubrication is effected similar to that explained in connection with FIG. 1 and the same low coefficients of friction likewise here prevail.

The structure of FIG. 1 may require a larger passage 12 than that shown and described in connection therewith. If a larger duct is required, the end 516 of the sealing tube 417 (FIG. 5) can be constructed to have an externally extending lip, as seen in FIG. 5. The other reference numerals in FIG. 5 correspond to those of FIG. 1. The end portion 516 is held in the wall of the bore 2 of the cylinder and by a preformed collar portion 3' of the bottom cover plate 503 of the cylinder for secure and sealed connection.

The transition zone A may have various shapes and arrangements with respect to the partial elements thereof, as shown, for example, in FIGS. 6 to 13.

Figure 6:
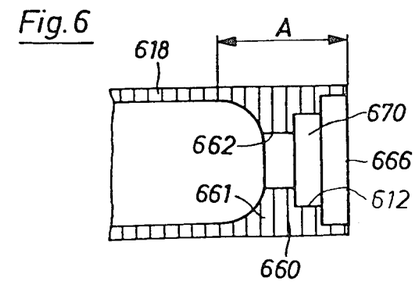
FIG. 6 is a fragmentary transverse section of a portion of the cylinder-piston arrangement illustrating a portion of the piston and the transition zone of the sealing tube with two elements.

FIG. 6: The transition zone A has two partial elements 660, 670 of different stiffness. The elements are attached or secured together for example by adhesives, or by chemical bonding in a junction surface 662. The partial element 660 is an extension of the end 618 of the sealing tube which is formed with a thickened region 661. It has lesser stiffness than the partial element 670 which is connected at its portion 666 to a piston (not shown).

Figure 7:
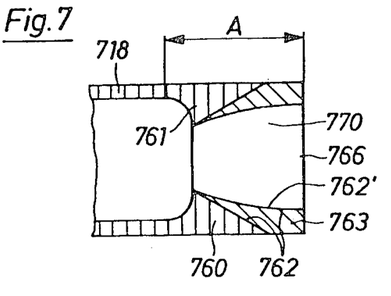
FIG. 7 is a view similar to FIG. 6, having a transition zone with three elements.

FIG. 7: The transition zone A of the end 718 of the sealing tube includes three partial elements 760, 763, 770 having two junction surfaces 762, 762'. The junction surface between partial elements 760, 763 extends at an inclination from the side of the working pressure fluid and passes through the surface of the transition zone A. The piston not shown is connected to the end portion 766 of partial element 770.

Figure 8:
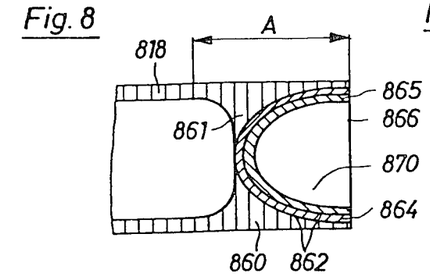
FIG. 8 is a transverse section similar to FIG. 6, showing a transition zone having four partial elements with junction surfaces below the top surface of the transition zone.

FIG. 8 shows the end 818 of the tube in the transition zone A, and four partial elements 860, 864, 865, 870. The two partial elements 864, 865 are formed as closed tubes or sleeves and are located between the partial elements 860, 870. The relative stiffness of all the partial elements is different, decreasing in the direction towards partial element 860 from the stiffest element 870. All junction surfaces 862 are within the transition zone A. End portion 866 of partial element 870 is secured to a piston not shown. The end 818 of the tube is formed with a thickened region 861.

Figure 9:
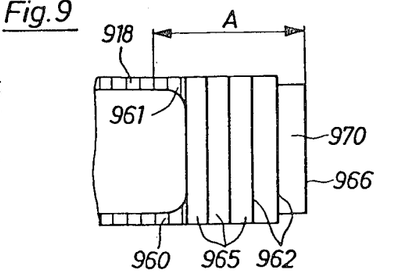
FIG. 9 is a transverse section of a transition zone having six partial elements.

FIG. 9: The end 918 of the tube is located in a transition zone A formed of six partial elements. A thickened region 961 has a partial element 960 of lowest stiffness applied thereto; four disk-shaped partial elements 965 of increasing stiffness are joined to the partial element 960 and the last element 970 of highest stiffness is connected with its end portion 966 to a piston not shown. The intermediate junction surfaces 962 include at least one secured bonded connection. Due to the larger number of partial elements, with increasing stiffness, the pressure with respect to the support wall does not increase in excessively great steps even if, as in this embodiment, the junction surfaces of the disk-shaped partial elements penetrate the surface of the transition zone A. Not all the junction surfaces have to be adhered together if the piston 966 is constantly loaded by a counteracting force, for example by a spring, holding the elements together.

Figure 10:
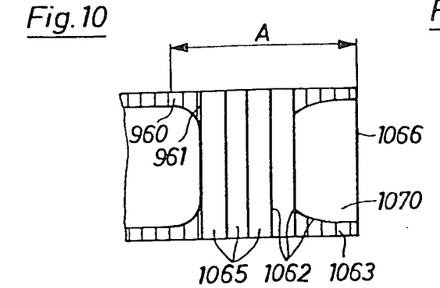
FIGS. 10 and 11 are transverse sections of a transition zone having seven partial elements.

FIG. 10: The arrangement is similar to FIG. 9. The transition zone A has seven partial elements. The partial element 1065 is joined to a sleeve-like partial element 1063. The junction surfaces are shown at 1062; the stiffest partial element 1070 is connected with its end portion 1066 to a piston not shown.

Figure 11:
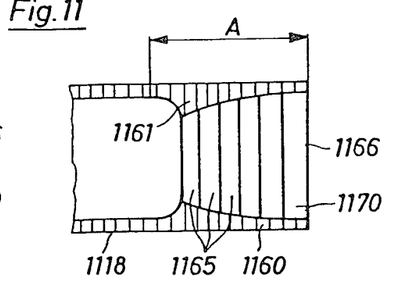

FIG. 11: The end 1118 of the sealing tube is within the transition zone A and merges into partial element 1160 which has a decreasing thickness looked at from the side of the working pressure fluid. Five partial elements 1165 are located within the partial element 1160, as is the partial element 1170 of highest stiffness which, again, is connected with its end portion 1166 to a piston not shown. A thickened portion of end 1118 of the tube is shown at 1161. If the number of partial elements of increasing stiffness is increased and the thickness of the partial elements is decreased then, in a limiting condition, a transition zone in which the stiffness changes continuously with respect to the length will result. Such transition zone can be made of suitable plastic, for example polyurethane, and can be so constructed that the piston may be regarded to form an integral part thereof.

Figure 12:
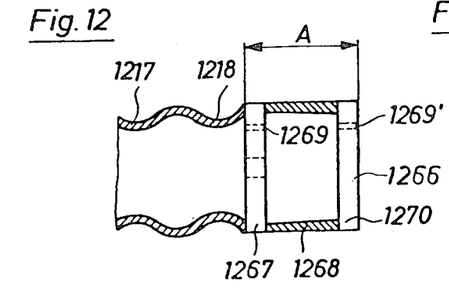
FIG. 12 is a fragmentary sectional view of a transition zone having three partial elements joined to an elastic, flexible metal tube.

FIG. 12: A corrugated metal tube 1217 is provided as axially deformable sealing member and has an end 1218 which is joined to the transition zone A consisting of the partial elements 1267, 1268, 1270. Although the partial elements may all consist of the same material, deformation of the transistion zone is non-uniform. The partial element 1268 has a wall thickness which increases towards the piston. Preferably, the working pressure fluid is applied from the inside against the partial element 1268. The partial element 1268 forms a trottling region or choke for the pressure lubrication flow and provides an automatically regulated choking passage therefor. Partial elements 1267, 1270 are provided for guidance. They may be formed with grooves at the outside thereof to permit passage of lubricant, as schematically shown at 1269, 1269'.

Figure 13:
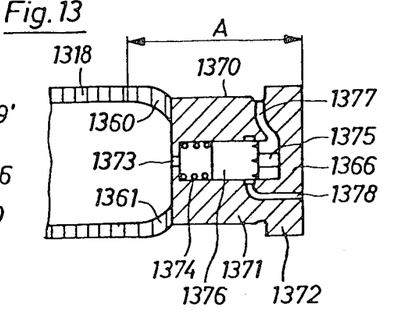
FIG. 13 is a transverse sectional view of a transition zone having two partial elements.

FIG. 13: The choke or throttle for the lubricant, in which the choking or throttling action is controlled by the pressure of the working pressure fluid, is located within the transition zone A. The transition zone, joined to the end 1318 of the flexible tube, includes the partial element 1360 with the thickening 1361 and a stiff, non-deformable partial element 1370 merging into an end face 1366. The partial element 1370 has a partial zone 1371 at the side of the sealing tube, which zone 1371 is formed of reduced diameter relative to the adjacent zone 1372. The zone 1372 has a diameter which has just slight play with respect to the wall of the cylinder.

The choke is formed by a piston 1376 which may be held by means of a spring 1374 against a stop or abutment 1375. A bore 1373 is in communication with the working pressure fluid. The lubricant passes along the zone 1371 and in the gap formed by the reduced diameter thereof and then through a passage 1377 toward the face of the piston 1376 which is opposed to the face against which the working pressure fluid is applied. The lubricant forces the piston towards the left (FIG. 13) and is relieved of pressure and drains off through drain line 1378 which terminates in the ring duct selectively opened by leftward movement of the choke piston 1376. Thus a lubricant channel is formed between the lubricant flow passage and a low-pressure side, in which channel there is a regulating member of well defined shape and function.

A minor portion of the lubricant flows through the gap formed by the enlarged zone 1372 of the partial element 1370 and the inner wall of the cylinder. This gap may, if desired, be sealed, for example by an O-ring. The lubricant pressure is held in balance with the working fluid pressure also in the arrangement of FIG. 13. Movement of the choke piston 1376 can be damped by suitable damping arrangments, not shown, and well known.

Partial elements in the form of thin metallic disks located between other partial elements of lower stiffness may be used. Also, partial elements of substantial stiffness which have surface coatings, or surface layers of materials of lesser stiffness, can be used.

The transition zone A should be arranged to include partial elements of differential stiffness and with junction surfaces passing through the outside surface thereof. Such partial elements have stepped characteristics which are effective up to the outer surface of the transition zone regarding localized deformation. Thus, the decrease of pressure on the support wall occurs in steps within the transition zone A or within a partial region thereof. Continuously decreasing pressure against the support wall can be obtained by a transition zone which has either a continuously variable stiffness or a finite number of partial elements which are so arranged that the junction surfaces are located beneath the surface of the transition zone and are continuous. The least stiff (or most flexible) partial element then covers the entire surface of the transition zone, as shown in FIGS. 1, 4, 8 and 11, for example. Looked at from the working pressure fluid, the stability of shape of the transition zone is progressively increasing.

The length of the transition zone A is indicated by the respective arrows in the respective Figures, and extends from an end 18 (and 418, 518 . . . 1318) of the sealing tube, that is, from that point at which the thickness of material of the sealing tube begins to vary, up to the partial element which is connected to the piston (not shown). The embodiments described in connection with FIGS. 6, 13 may be applied to the arrangement shown in FIG. 4 or FIG. 5, and are not restricted to the specific embodiment shown, which is illustrated in connection with the structure specifically described in connection with FIG. 1.

The working pressure of the piston-cylinder combination may be high, for example 100 at-gauge, and higher. The sealing tube 17, 35 may have good characteristics regarding elasticity, due to its support on the wall of the cylinder, so that the force necessary to merely move the piston, that is, to overcome friction only, is low. The coefficient of friction can be so low that, when utilizing pressure lubrication, the coefficient of friction may be less than 0.001. This particularly low friction can be obtained by the hydrostatic bearing obtained between the sealing tube and the adjacent inner surface of the support wall, since the sealing tube surface and the inner surface of the support wall are not in physical engagement with each other, due to the interposed film of lubricant.

If the working fluid is practically incompressible under high pressure operating conditions the displacement of the piston-cylinder combinations is effectively directly proportional to the quantity of working pressure fluid supplied. The combination may be used for leakproof piston pumps, for servo positioning systems and the like. Placing two piston-cylinder combinations in paired arrangement and connecting the two pistons (or cylinders, respectively) together results in the double-acting combination.

The pressure lubrication results in extremely low coefficients friction. Low friction is also obtainable without pressure lubrication, however, if slippery sliding surfaces 21 are applied to the sealing tube, and/or to the engaging movable surface. Such sliding surface may be elastic or flexible mesh or net systems made, for example, of smooth or textured manmade fibers or yarns, such as nylon, PTFE ("Teflon") or the like. Threads, yarn, or woven or knit fabric made of such material may be applied to the sealing tubes, if necessary, with an intermediate layer of other adhesive or adhering yarn or thread made, for example, of elastic material, various types of elastomers, nylon, cotton, or the like.

Various changes and modifications may be made and features described in connection with any one of the embodiments may be used with any of the others, within the scope of the inventive concept.

What I claim is:

1. A piston and cylinder combination, particularly for high-pressure fluid application, comprising:

two relatively movable working members one of which defines a piston and the other of which defines a cylinder;

said two relatively movable working members defining therebetween a working chamber with strokes of increasing and decreasing alternately operating working chamber volume, one of said strokes defining a high-pressure stroke;

a deformable sealing member connected with each of said working members so as to hermetically seal the working chamber;

a support surface provided at one side of said sealing member for supporting such sealing member against the action of pressure prevailing in the working chamber;

said support surface and said sealing member defining therebetween a lubricant flow passage, said lubricant flow passage including an outlet end comprising a terminal outflow extremity on one side of said lubricant flow passage during said high-pressure stroke and communicating with a low-pressure side defining a low-pressure region in relation to the working chamber pressure;

means for introducing lubricant into the other side of said lubricant flow passage in order to maintain a flow of lubricant through said lubricant flow passage and out of said outlet end thereof and into said low-pressure side under the action of the pressure in said working chamber at least during part of said high-pressure stroke.

2. The apparatus as defined in claim 1, wherein:

said lubricant introducing means replenishes the lubricant at least during part of a stroke of the working members with a flow rate which is substantially independent from the pressure in said working chamber or in said lubricant flow passage.

3. The apparatus as defined in claim 1, wherein:

said deformable sealing member is a tube-like element having a tube body with an axis, said tube-like element being secured to said working members at two locations of the tube body having mutual distance in direction of the tube axis, the tube-like element facing with its inner or outer surface said lubricant flow passage and said support surface.

4. The apparatus as defined in claim 3, wherein:

said lubricant flow passage is formed between the said facing surface of said tube-like element and said support surface and extends in axial direction of the tube-like element substantially between the said two locations of the tube body being secured to said working members.

5. The apparatus as defined in claim 1, wherein:

throttle means are provided at the region of the outlet of said lubricant flow passage near the low-pressure side for throttling the throughflow of lubricant through the lubricant flow passage under the action of the pressure of said lubricant in said lubricant flow passage on one side and under the action of the pressure prevailing in the working chamber on the other side so as to automatically maintain substantial equilibrium between the pressures prevailing on both sides of said sealing member.

6. The apparatus as defined in claim 5, wherein:

introduction of the lubricant in said lubricant flow passage is limited partially or completely to low-pressure strokes in the course of the operating cycles, each of which comprises a low-pressure stroke and a high-pressure stroke, with establishing sufficient reserve for maintaining lubricant flow through said passage and said throttle means and out of said outlet end of the lubricant flow passage to said low-pressure side for maintaining pressure balance on both sides of said sealing member during each high-pressure stroke following a low-pressure stroke.

7. A piston and cylinder combination, particularly for high-pressure fluid application, comprising:

two relatively movable working members one of which defines a piston and the other of which defines a cylinder;

said two relatively movable working members defining therebetween a working chamber with strokes of increasing and decreasing alternately operating working chamber volume;

a deformable sealing member connected with each of said working members so as to hermetically seal the working chamber;

a support surface provided at one side of said sealing member for supporting such sealing member against the action of pressure prevailing in the working chamber;

said support surface and said sealing member defining therebetween a lubricant flow passage;

means for introducing lubricant into said lubricant flow passage in order to maintain at least a portion of said sealing member out of contact with said support surface at least during part of at least one of said strokes;

throttle means for throttling said lubricant flow through the lubricant flow passage so as to establish a pressure in the flowing lubricant sufficient to maintain substantial equilibrium between the pressures on both sides of said deformable sealing member and to keep the sealing member out of direct contact with said support surface, said throttle means comprising a part of said sealing member located in the region of the low-pressure side;

said lubricant flowing through said lubricant flow passage to a low-pressure side under the action of the pressure in said working chamber at least during part of each operating cycle consisting of a stroke with increasing working chamber volume and a stroke with decreasing working chamber volume.

8. A piston and cylinder combination, particularly for high-pressure fluid application, comprising:

two relatively movable working members one of which defines a piston and the other of which defines a cylinder;

said two relatively movable working members defining therebetween a working chamber with strokes of increasing and decreasing alternately operating working chamber volume;

a deformable sealing member connected with each of said working members so as to hermetically seal the working chamber;

a support surface provided at one side of said sealing member for supporting such sealing member against the action of pressure prevailing in the working chamber;

said support surface and said sealing member defining therebetween a lubricant flow passage, said deformable sealing member comprising a tube-like element having a tube body with an axis, said tube-like element being secured to said working members at two locations of the tube body having mutual distance in the direction of the tube axis, the tube-like element facing with its inner or outer surface said lubricant flow passage and said support surface, said lubricant flow passage being formed between the said facing surface of said tube-like element and said support surface and extending in the axial direction of the tube-like element substantially between the said two locations of the tube body secured to said working members;

means for introducing lubricant into said lubricant flow passage in order to maintain at least a portion of said sealing member out of contact with said support surface at least during part of at least one of said strokes;

throttle means for throttling said lubricant flow through the lubricant flow passage so as to establish a pressure in the flowing lubricant sufficient to maintain substantial equilibrium between the pressures on both sides of said deformable sealing member and to keep the sealing member out of direct contact with said support surface, said throttle means being formed by a portion of the tube-like element which is deformed radially towards the said support surface to form a portion of said passage having reduced radial width;

said lubricant flowing through said lubricant flow passage to a low-pressure side under the action of the pressure in said working chamber at least during part of each operating cycle consisting of a stroke with increasing working chamber volume and a stroke with decreasing working chamber volume.

9. The apparatus as defined in claim 8, wherein:
said throttle means is automatically adjusted by the pressure of the lubricant in said lubricant flow passage and by the pressure in said working chamber to maintain lubricant flow through said passage to said low pressure side.

10. A piston and cylinder combination, particularly for high-pressure fluid application, comprising:
two relatively movable working members one of which defines a piston and the other of which defines a cylinder;
said two relatively movable working members defining therebetween a working chamber with strokes of increasing and decreasing alternately operating working chamber volume;
a deformable sealing member connected with each of said working members so as to hermetically seal the working chamber;
a support surface provided at one side of said sealing member for supporting such sealing member against the action of pressure prevailing in the working chamber;
said support surface and said sealing member defining therebetween a lubricant flow passage;
throttle means for throttling said lubricant flow through the lubricant flow passage so as to establish a pressure in the flowing lubricant sufficient to maintain substantial equilibrium between the pressures on both sides of said deformable sealing member and to keep the sealing member out of direct contact with said support surface;
said deformable sealing member comprising a tube-like element having a tube body with an axis, said tube-like element being secured to said working members at two locations of the tube body having mutual distance in the direction of the tube axis, the tube-like element facing with its inner or outer surface said lubricant flow passage and said support surface;
said deformable tube-like sealing member including a transition zone extending in the downstream direction to said location of said tube-like member where it is secured to the working member which, in operation, moves relatively to said support surface, said location where the deformable tube-like sealing member is secured to said moving working member including a junction between said sealing member and said working member extending in the direction of movement of said working member, and said throttle means being formed by a portion of the tube-like sealing member located at least partially within said transition zone;

means for introducing lubricant into said lubricant flow passage in order to maintain at least a portion of said sealing member out of contact with said support surface at least during part of at least one of said strokes;

said lubricant flowing through said lubricant flow passage to a low-pressure side under the action of the pressure in said working chamber at least during part of each operating cycle consisting of a stroke with increasing working chamber volume and a stroke with decreasing working chamber volume.

11. The apparatus as defined in claim 10, wherein:
said facing surface of said tube-like sealing member in said transition zone has a radial distance from said support surface in the unstressed condition of the tube-like sealing member 12. A working and sealing member combination, particularly for high-pressure fluid application, comprising:
two working members arranged movable relatively to each other and including therebetween a working chamber of variable volume;
a deformable sealing member connected with each of said working members so as to define and seal said working chamber;
a support surface provided at one side of said sealing member for supporting the sealing member against the pressure prevailing in the working chamber;
said support surface and said sealing member defining therebetween a lubricant flow passage connected on one side with lubricant supplying means and with a lubricant flow outlet on the other side;
said lubricant supplying means and said lubricant flow outlet being arranged so as to establish under the action of the pressure in the working chamber a lubricant flow through said passage and through said outlet to a low pressure side, said lubricant flow being throttled by said outlet such that the dynamic pressure established in the flowing lubricant keeps the sealing member out of direct contact with said support surface during at least part of said variation of the working chamber volume.

13. A working and sealing member combination as defined in claim 12, wherein:
said sealing member consists at least partially of a soft, elastically deformable elastomeric material.

14. A working and sealing member combination as defined in claim 13, wherein:
said lubricant flow outlet comprises a part of said sealing member consisting of said soft, elastically deformable elastomeric material located adjacent to said low-pressure side.

15. A working and sealing member combination as defined in claim 14, wherein:
said deformable sealing member is a tube-like element having a tube body with an axis, said tube-like element being secured to said working members at two locations of the tube body having mutual distance in direction of the tube axis, the tube-like element facing with its inner or outer surface said lubricant flow passage and said support surface; and wherein said lubricant flow passage is formed between the said facing surface of said tube-like element and said support surface and extends in axial direction of the tube-like element substantially between the said two locations of the tube body being secured to said working members.

16. A working and sealing member combination as defined in claim 12, wherein:

said lubricant flow outlet is arranged so as to be automatically adjusted by the counteraction of the pressures in said working chamber and in said lubricant flow passage, such that at least substantial equilibrium between both said pressures is maintained without direct contact between said sealing member and said support surface during at least part of the variation of the working chamber volume.

17. A working and sealing member combination as defined in claim 12, wherein:

said sealing member consists at least partially of an elastically deformable material;

said lubricant flow outlet comprises a part of said sealing member consisting of said elastically deformable material located adjacent to said low-pressure side;

said lubricant flow outlet is arranged so as to be automatically adjusted by the counteraction of the pressures in said working chamber and in said lubricant flow passage, such that at least substantial equilibrium between both said pressures is maintained without direct contact between said sealing member and said support surface during at least part of the variation of the working chamber volume.

* * * * *

UNITED STATES PATENT OFFICE
CERTIFICATE OF CORRECTION

PATENT NO. : 4,329,914
DATED : May 18, 1982
INVENTOR(S) : BERNHARD FREY

It is certified that error appears in the above-identified patent and that said Letters Patent are hereby corrected as shown below:

On the title page, item [73], please change "Jydrpwatt" to read --Hydrowatt--

Signed and Sealed this

First Day of February 1983

[SEAL]

Attest:

GERALD J. MOSSINGHOFF

*Attesting Officer*     *Commissioner of Patents and Trademarks*